United States Patent
Munjal et al.

(10) Patent No.: US 7,870,443 B2
(45) Date of Patent: Jan. 11, 2011

(54) METHOD TO ISOLATE CRASH OF AN EMBEDDED MULTI-THREADED APPLICATION TO A SHARED LIBRARY CALL WITHOUT CORE DUMP FILES OR DEBUGGER

(75) Inventors: Ashish Munjal, Round Rock, TX (US); Arun Muthaiyan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 271 days.

(21) Appl. No.: 12/257,198

(22) Filed: Oct. 23, 2008

(65) Prior Publication Data

US 2010/0107017 A1    Apr. 29, 2010

(51) Int. Cl.
    *G06F 11/00* (2006.01)
(52) U.S. Cl. .................................... 714/48; 714/34
(58) Field of Classification Search ............ 714/48, 714/47, 45, 46, 38, 49, 34, 30; 717/129, 717/128, 124, 126
See application file for complete search history.

(56) References Cited

U.S. PATENT DOCUMENTS

| | | | |
|---|---|---|---|
| 5,632,032 A * | 5/1997 | Ault et al. | 718/100 |
| 6,480,818 B1 | 11/2002 | Alverson et al. | 703/26 |
| 6,848,097 B1 | 1/2005 | Alverson et al. | 717/124 |
| 7,206,964 B2 * | 4/2007 | Moser et al. | 714/13 |
| 7,228,452 B2 * | 6/2007 | Moser et al. | 714/4 |
| 7,299,476 B2 * | 11/2007 | Baudry et al. | 719/312 |
| 7,428,727 B2 | 9/2008 | Alverson et al. | 717/134 |
| 2010/0037242 A1 * | 2/2010 | Mannarswamy et al. | 719/328 |

* cited by examiner

*Primary Examiner*—Dieu-Minh Le
(74) *Attorney, Agent, or Firm*—Baker Botts L.L.P.

(57) ABSTRACT

The present disclosure relates in general to embedded information handling systems, and more particularly to systems and methods for isolating a crash of an embedded multi-threaded application to a shared library call in embedded information handling systems.

20 Claims, 6 Drawing Sheets

METHOD TO ISOLATE CRASH OF AN EMBEDDED MULTI-THREADED APPLICATION TO A SHARED LIBRARY CALL WITHOUT CORE DUMP FILES OR DEBUGGER

TECHNICAL FIELD

The present disclosure relates in general to embedded information handling systems, and more particularly to systems and methods for isolating a crash in embedded information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Debugging is a challenge in embedded environments for projects of high complexity that involve concurrent incremental development of a multi-threaded application (e.g., a power management application on a chassis management controller (CMC)) along with the development of shared libraries for an embedded CMC. For example, there may be constraints on persistent storage where generating core dump files running debuggers is limited due to the embedded environment.

SUMMARY

Accordingly, a need has arisen for improved systems and methods for isolating a crash in an embedded environment without core dump files or a debugger. In accordance with the teachings of the present disclosure, the disadvantages and problems associated with isolating a crash with a core dump file or debugger have been substantially reduced or eliminated.

In some embodiments, the present disclosure relates to methods for isolating errors in an embedded information handling system including a multi-threaded application having a signal handler, a shared library having at least one function, and a library encapsulation module having a function clone associated with up to each function of the shared library. For example, a method may comprise (a) a first calling thread of the multi-threaded application calling a first function clone associated with a first function of the shared library; (b) the called first function clone determining a process ID associated with the first calling thread and a function ID associated with the called first function; (c) the called first function clone storing the process ID associated with the first calling thread and a function ID associated with the called first function to a library encapsulation table protected by a mutex; (d) the called first function clone calling the called first function; (e) the called first function generating an error; (f) the signal handler catching the error; (g) the signal handler determining the function ID and process ID associated with the error using the library encapsulation table; and/or (h) the signal handler writing the process ID and function ID associated with the error to a log file. In some embodiments, steps (a) through (h) may be executed in sequence. A method may include, according to some embodiments, one or more successful function calls. For example, a method may further comprise (a') a second calling thread of the multi-threaded application calling a second function clone associated with a second function of the shared library; (b') the called second function clone determining a process ID associated with the second calling thread and a function ID associated with the called second function; (c') the called second function clone storing the process ID associated with the second calling thread and a function ID associated with the called second function to a library encapsulation table protected by a mutex; (d') the called second function clone calling the called second function; (d')(1) executing the called second function without an error; and (d')(2) removing the process ID associated with the second calling thread and a function ID associated with the called second function from the library encapsulation table, wherein the removing is performed by the called function clone, wherein (a') through (d')(2) are performed before (a) through (h). A method may comprise (i) closing the multi-threaded application upon or after an error, in some embodiments. A method may include performing (a) through (h) without creating or using core dump files or a debugger, according to some embodiments.

In some embodiments, the present disclosure relates to methods for isolating errors in an embedded information handling system including a multi-threaded application having a signal handler, a shared library having at least one function, and a library encapsulation module having a function clone associated with up to each function of the shared library. For example, a method may comprise (a) calling the function clone associated with one of the functions of the shared library, wherein the calling is performed by a calling thread of the multi-threaded application, the calling thread includes a calling thread ID, and the one of the functions of the shared library includes a function ID; (b) determining the calling thread ID of the calling thread and the function ID of the function using the called function clone; (c) storing the calling thread ID of the calling thread and the function ID of the function to a library encapsulation table protected by a mutex, wherein the storing is performed by the called function clone; (d) calling the function associated with the called function clone, wherein the calling is performed by the called function clone; and (e)(1) executing the called function without an error, whereupon the called function clone removes the calling thread ID and the called function ID from the library encapsulation table, or (2) executing the called function with an error, whereupon the signal handler catches the error, determines the function ID and the process ID associated with the error using the library encapsulation table, and writes the process ID and function ID associated with the error to a log file. Steps (a) through (e) may be executed in sequence, according to some embodiments. A method may comprise, according to some embodiments, (f) closing the multi-threaded application upon or after an error. A method may include performing (a) through (e)(2) without creating or using core dump files or a debugger, according to some embodiments.

A multi-threaded application may comprise (e.g., may be), in some embodiments, a power management multi-threaded application. Determining the function ID associated with the called first function may include, in some embodiments, comprises deriving the string field of the function using a _FUNCTION_ preprocessor macro.

The present disclosure related, in some embodiments, to systems for isolating errors in an embedded information handling system. For example, an embedded information handling system may comprise a processor; a memory communicatively coupled to the processor; a local storage resource communicatively coupled to the processor; a multi-threaded application having a signal handler executable by the processor; a shared library communicatively coupled to the processor, the shared library having at least one function; and a library encapsulation module having a function clone associated with up to each function of the shared library. In some embodiments, an embedded information handling system may be configured to (a) call the function clone associated with one of the functions of the shared library, wherein the calling is performed by a calling thread of the multi-threaded application, the calling thread includes a calling thread ID, and the one of the functions of the shared library includes a function ID; (b) determine the calling thread ID of the calling thread and the function ID of the function using the called function clone; (c) store the calling thread ID of the calling thread and the function ID of the function to a library encapsulation table protected by a mutex, wherein the storing is performed by the called function clone; (d) call the function associated with the called function clone, wherein the calling is performed by the called function clone; and (e)(1) remove from the library encapsulation table the calling thread ID and the called function ID upon error-free execution of the called function, or (2) catch any error that occurs during execution, determine the function ID and the process ID associated with the error using the library encapsulation table, and write the process ID and function ID associated with the error to a log file. In some embodiments, an embedded information handling system is configured to (f) close the multi-threaded application upon or after an error.

An embedded information handling system may comprise (e.g., may be), in some embodiments, a power management multi-threaded application. Determining the function ID associated with the called first function may include, in some embodiments, comprises deriving the string field of the function using a _FUNCTION_ preprocessor macro. An embedded information handling system, according to some embodiments, may lack a core dump file and/or a debugger.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
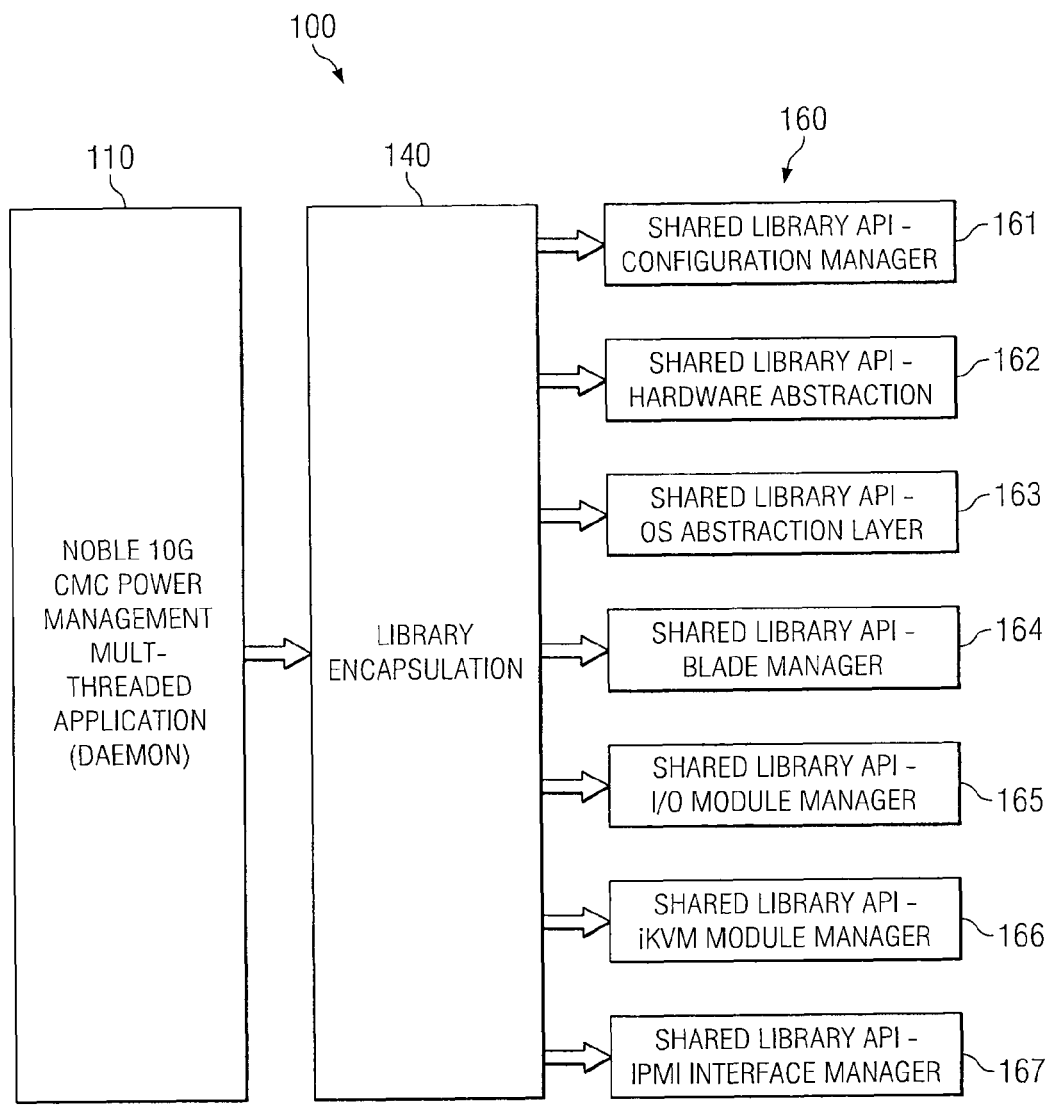
FIG. 1 illustrates a block diagram of an example system for isolating a crash in an embedded information handling system, in accordance with the present disclosure.

Preferred embodiments and their advantages are best understood by reference to FIGS. 1, 2, 3, and 4 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

The present disclosure relates in general to embedded information handling systems, and more particularly to systems and methods for isolating a crash of an embedded multi-threaded application to a shared library call in embedded information handling systems. According to some embodiments, an embedded environment may include heterogeneous embedded systems, distributed embedded systems, and/or heterogeneous, distributed embedded systems. For example, an embedded environment may include a plurality of processors and/or a plurality of architectures (e.g., digital signal processing architectures, reduced instruction set computing architectures, network architectures). Non-limiting examples of embedded environments include embedded programming for a cell phone, embedded development for routers/switches, embedded development devices used for oil drilling, and/or embedded development devices used in a television.

According to some embodiments, a library encapsulation module is linked to a multi-threaded application and/or one or more share library modules, which may include shared library application programming interfaces (API). A library encapsulation module may include and/or be operably linked to a library encapsulation table. A library encapsulation table may be protected, for example, by a mutex, and/or stored in shared memory.

A library encapsulation module may include shared library API function clones that may be created, in some embodiments, using a compile time macro. For example, a preprocessor compiler macro, according to some embodiments, may be used to clone shared library API functions and link the shared library modules and the multi-threaded application.

According to some embodiments, entry from the multiple threads of the multi-threaded application into the multiple shared library API functions may be recorded as separate entries in the library encapsulation table with the calling thread's process ID (PID) and referenced later by the library encapsulation module. For example, when a thread from the multi-threaded application makes a call into one of the shared library API function clones, the string field of the function may be derived using the _FUNCTION_ macro; together with the calling thread's PID, this string field may be saved, for example, in an unused entry in the library encapsulation table (mutex protected). After (e.g., immediately after) the shared library API function call (i.e., within the shared library API function clone), the library encapsulation table entry associated with the calling thread's PID and the string field of the shared library API function may be cleared to record the completion and exit from the shared library API call (mutex protected).

If, at run time, a null pointer exception occurs within a specific shared library API function call (e.g., an exception that occurs because shared libraries are in incremental development concurrently with applications) signal handler of the multi-threaded application may catch the exception and record the contents of the library encapsulation module into a log file kept, for example, in temporary storage space within the information handling system. If the exception occurred inside one of the shared library API function calls used by the multi-threaded application, the shared memory contents (e.g., the library encapsulation table) of the library encapsulation module contain the string field associated with the shared library API function call that caused the crash along with the PID of the thread that took an exception when inside the shared library API function call.

FIG. 1 illustrates a block diagram of an example system 100 for isolating a crash in an embedded information handling system, in accordance with the present disclosure. As depicted in FIG. 1, system 100 may comprise chassis management controller (CMC) power management multi-threaded application 110, library encapsulation module 140, and shared library APIs 161, 162, 163, 164, 165, 166, and 167. As depicted, library encapsulation module 140 is linked to CMC power management multi-threaded application 110 and shared library APIs 161, 162, 163, 164, 165, 166, and 167.

CMC power management multi-threaded application 110 may be inside a blade server chassis and may comprise a power management multi-threaded application to manage power allocation and monitor power utilization of a modular chassis. This application may utilize external API calls from multiple shared libraries that provide infrastructure services (e.g., hardware abstraction API, persistent storage configuration manager API, blade manager API, input/output module manager API, integrated keyboard, video, mouse (iKVM) module manager API, intelligent platform management interface (IPMI) manager API, operating system (OS) abstraction API, and others).

Library encapsulation module 140 may include one or more shared library application programming interface (API) clones. Library encapsulation module 140 may be a layer interface between CMC power management multi-threaded application 110 and the one or more shared library APIs.

As depicted, shared library API 161 is a configuration manager, shared library API 162 is a hardware abstraction, shared library API 163 is an OS abstraction layer, shared library API 164 is a blade manager, shared library API 165 is an I/O module manager, shared library API 166 is an iKVM module manager, and shared library API 167 is an IPMI interface manager. Shared libraries may reside on a chip.

Figure 2:
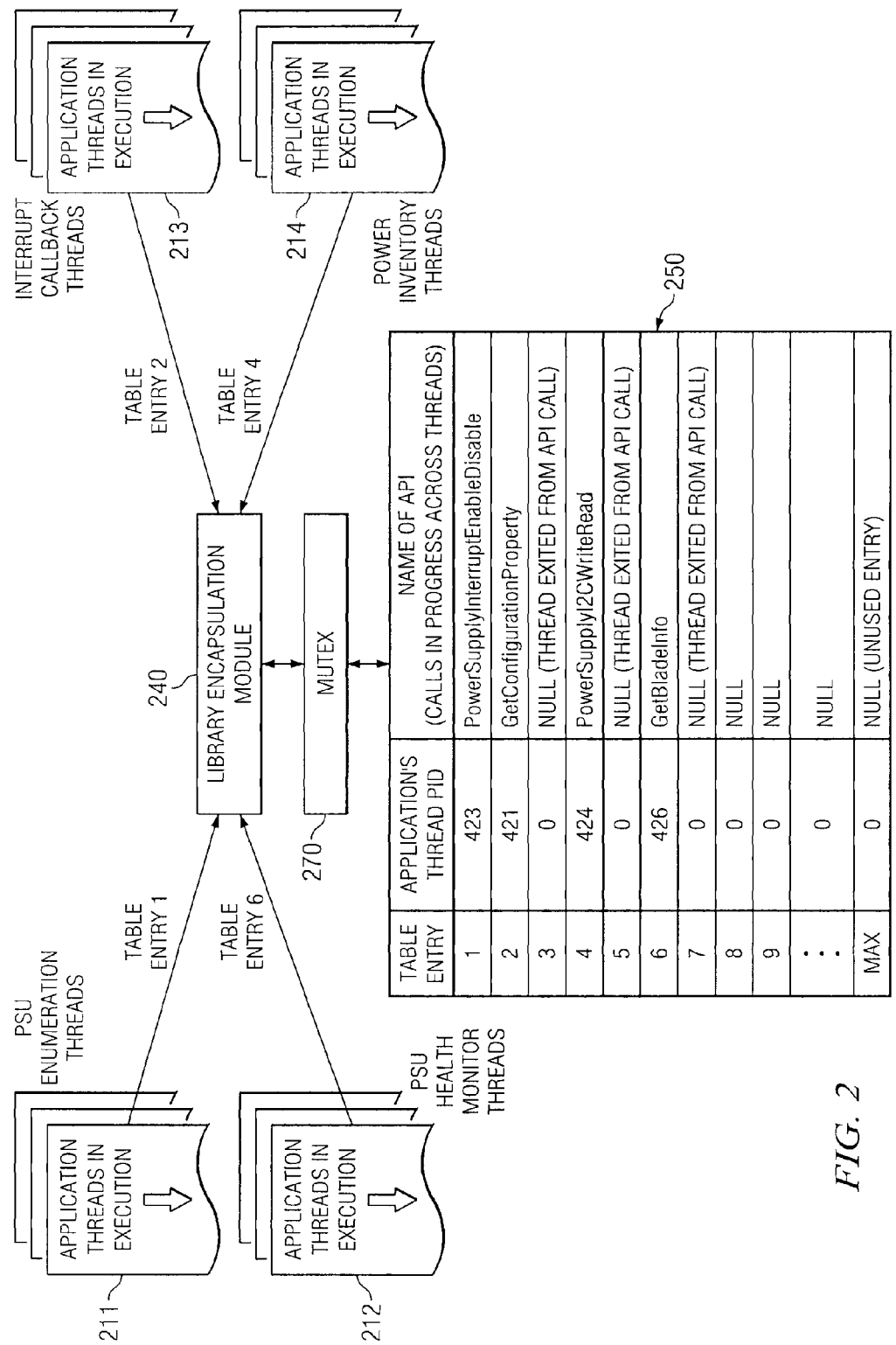
FIG. 2 illustrates a block diagram of an example system for isolating a crash in an embedded information handling system, in accordance with the present disclosure.

FIG. 2 illustrates a block diagram of an example system 200 for isolating a crash in an embedded information handling system, in accordance with the present disclosure. As depicted in FIG. 2, system 200 may comprise a multi-threaded application including power supply unit (PSU) enumeration threads 211, PSU health monitor threads 212, interrupt callback threads 213, and power inventory threads 214; library encapsulation module 240, library encapsulation table 250, and mutex 270.

As depicted, PSU enumeration threads 211, PSU health monitor threads 212, interrupt callback threads 213, power inventory threads 214 may make calls upon library encapsulation module 240 during execution of their respective applications whereupon library encapsulation module 240 adds corresponding entries to library encapsulation table 250. Then, when the shared library API function call has ended and the thread exits, the respective table entries are removed by library encapsulation module 240. Mutex 270 restricts access to table 250 such that only one thread at a time may add or remove entries. For each call in progress table 250 includes a table entry number, the application's thread PID, and the string field (e.g., the name of the API) associated with the shared library API and/or function that is accessed.

Figure 3:
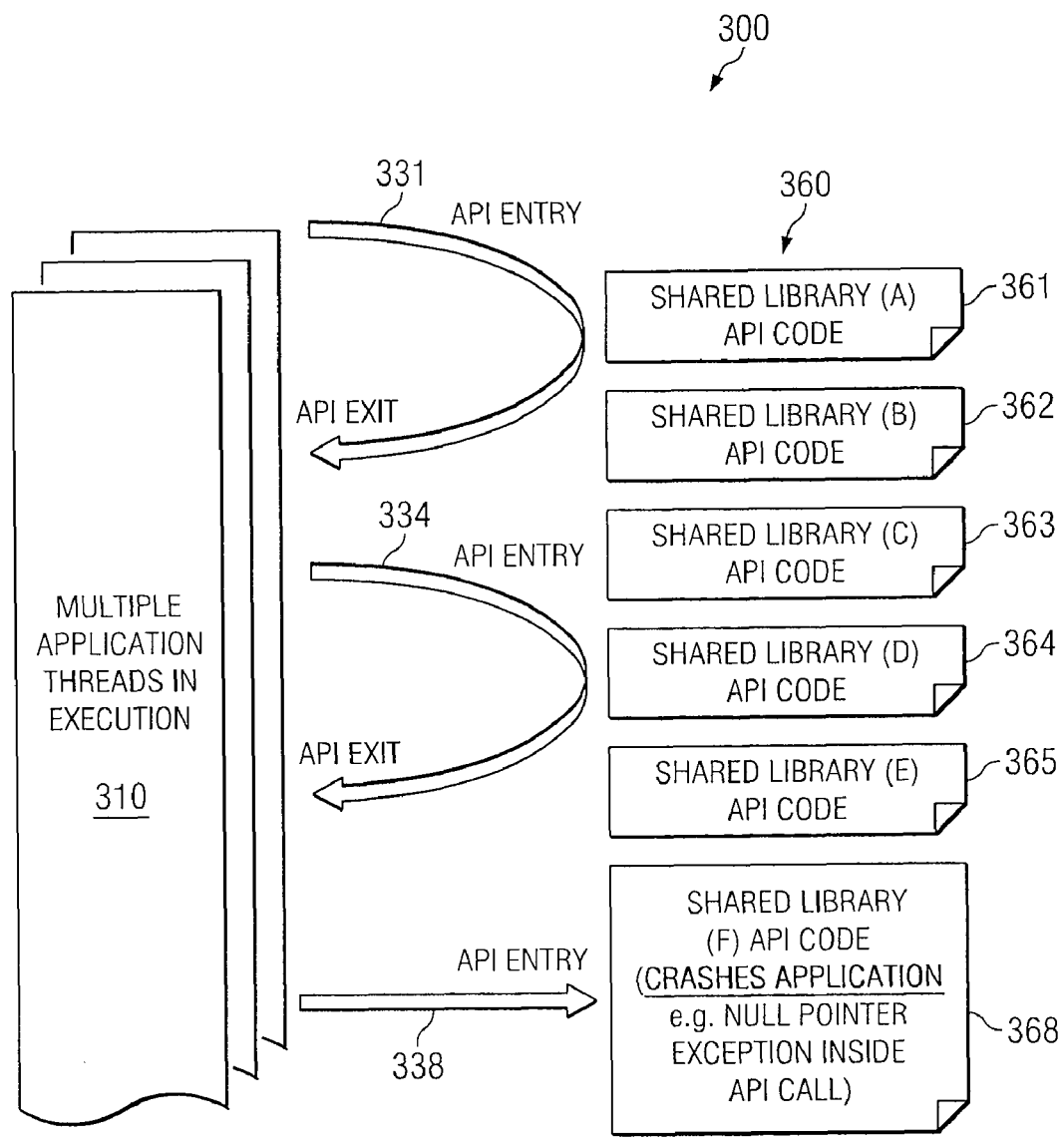
FIG. 3 illustrates a block diagram of an example system for isolating a crash in an embedded information handling system, in accordance with the present disclosure.

FIG. 3 illustrates a block diagram of an example system 300 for isolating a crash in an embedded information handling system, in accordance with the present disclosure. As depicted in FIG. 3, system 300 may comprise multiple application threads in execution 310, calls 331, 334, and 338, shared library (A) API code 361, shared library (B) API code 362, shared library (C) API code 363, shared library (D) API code 364, shared library (E) API code 365, and shared library (F) API code 368.

As depicted, calls 331 and 334 have a successful API entry into and exit from shared library (A) API code 361 and shared library (D) API code 364. By contrast, call 338 is shown to have a successful API entry into shared library (F) API code 368 followed by an application crash (e.g., a null pointer exception inside the API call).

Figure 4:
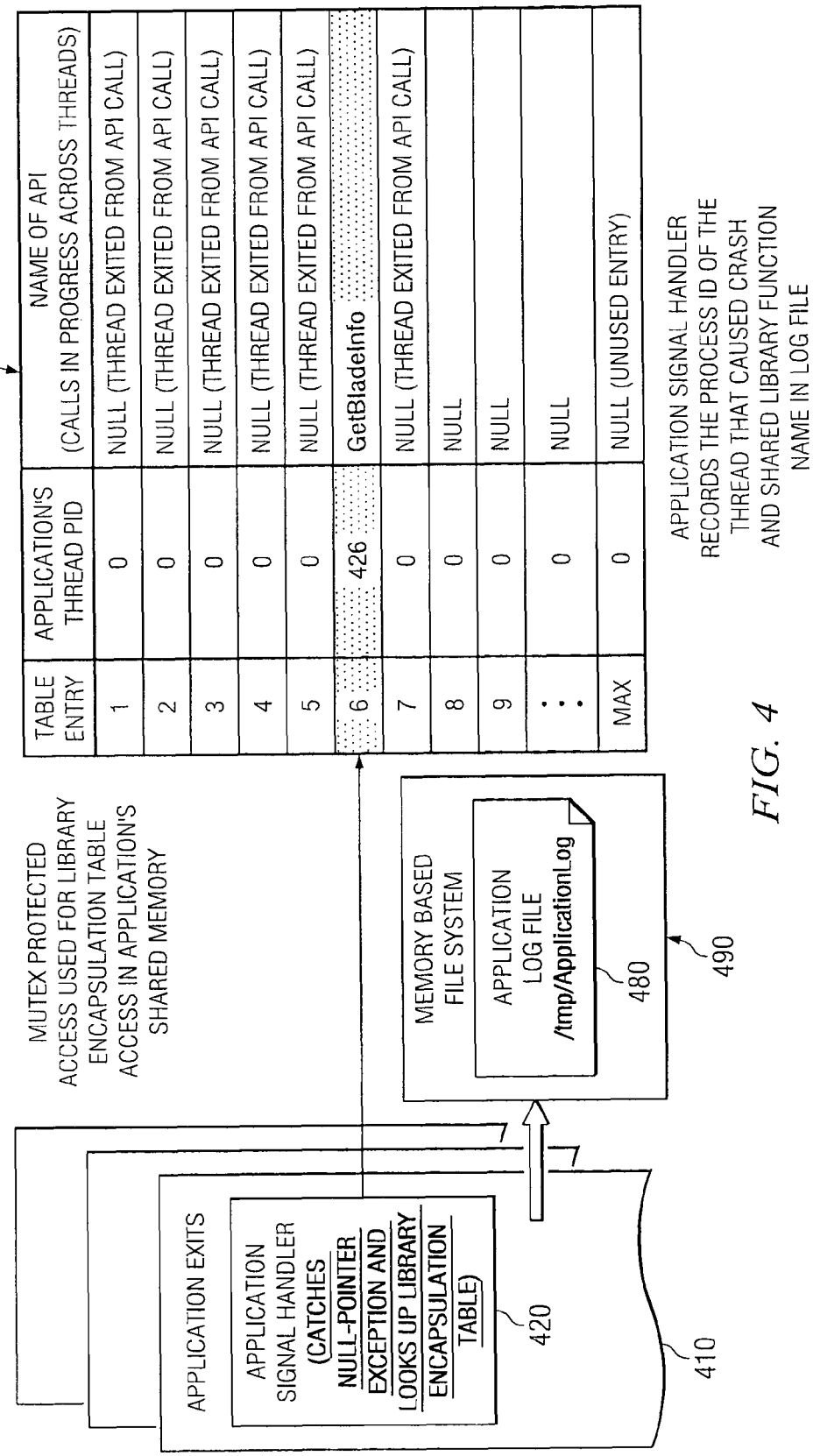
FIG. 4 illustrates a block diagram of an example system for isolating a crash in an embedded information handling system, in accordance with the present disclosure.

FIG. 4 illustrates a block diagram of an example system 400 for isolating a crash in an embedded information handling system, in accordance with the present disclosure. As depicted in FIG. 4, system 400 may comprise multi-threaded application 410 having application signal handler 420, table 450, application log file 480, and memory based file system 490.

As depicted, application signal handler 420 of application 410 catches the crash (e.g., null pointer exception like FIG. 3) and looks up library encapsulation table 450, and records the process ID of the thread that caused the crash and the name of the corresponding shared library API function in application log file 480, which is stored in memory based file system 490, and application 410 exits. Memory based file system 490 may include volatile and/or non-volatile memory.

Figure 5:
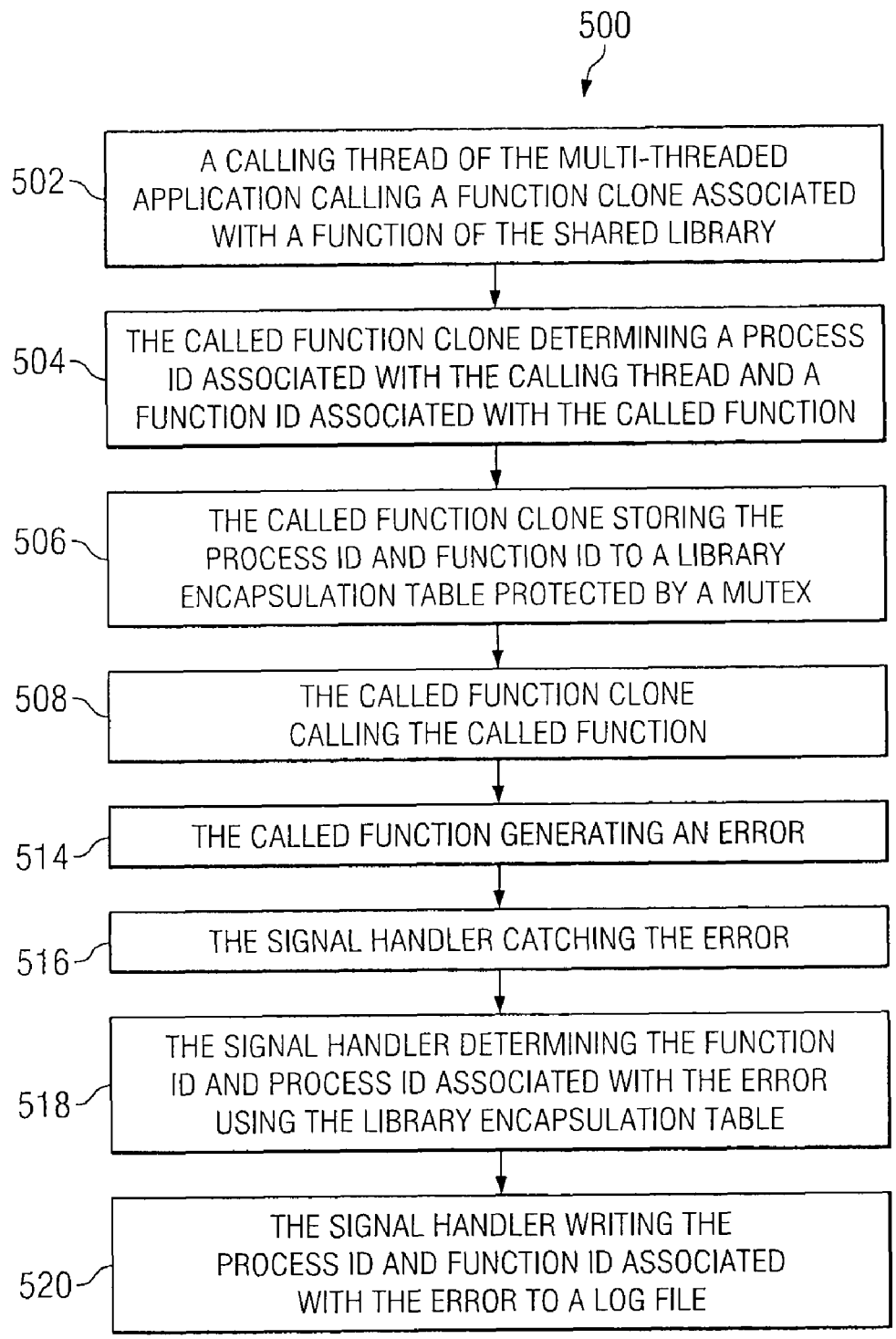
FIG. 5 illustrates a flow chart of an example method for isolating a crash in an embedded information handling system, in accordance with the present disclosure.

FIG. 5 illustrates a flow chart of an example method 500 for isolating a crash in embedded information handling system 5 (e.g., system 100, system 300) including a multi-threaded application 10 (e.g., application 110, application 310) having a signal handler 20 (e.g., signal handler 420), a shared library 60 (e.g., shared library 160, shared library 360) having at least one function, and a library encapsulation module 40 (e.g., library encapsulation module 140, library encapsulation module 240, library encapsulation module 340) having a function clone associated with each function of the shared library, in accordance with the present disclosure.

According to one embodiment, method 500 preferably begins at step 502. As noted above, teachings of the present disclosure may be implemented in a variety of configurations of system 5. As such, the preferred initialization point for method 500 and the order of the steps 502-520 comprising method 500 may depend on the implementation chosen.

At step 502, calling thread 31 of multi-threaded application 10 calls a function clone associated with a function of the shared library 60. For example, a CMC power management multi-threaded application 10 may include a power inventory thread that calls a clone of a power supply I2C write/read function.

At step 504, the called function clone determines a process ID associated with the calling thread and a function ID associated with the called function. Continuing with the example, the power supply I2C write/read function clone determines the process ID of the calling power inventory thread and the function ID of the called power supply I2C write/read function.

At step 506, the called function clone stores the process ID and function ID to a library encapsulation table 50 protected by a mutex 70. At step 508, the called function clone calls the called function. At step 514, the called function generates an error. For example, while executing or attempting to execute the function, the function crashes. In some embodiments, the crash may arise from any type of error including, for example, defective hardware, defective code, defective data, defective software, defective communication, user error, and the like, and/or combinations thereof.

At step 516, signal handler 20 catches the error. At step 518, signal handler 20 uses library encapsulation table 50 to determine the function ID and process ID associated with the error (e.g., the function ID of the called function and the process ID of the calling thread associated with the error). For example, library encapsulation module may include a table_lookup( ) function and signal handler 20 may pass the PID to the table_lookup( ) function, which returns the entry values. At step 520, signal handler 20 writes the process ID and function ID associated with the error to a log file.

Although FIG. 5 discloses a particular number of steps to be taken with respect to method 500, method 500 may be executed with greater or fewer steps than those depicted in FIG. 5. For example, method 500 may further comprise closing application 10 upon detecting the error. In addition, although FIG. 5 discloses a certain order of steps to be taken with respect to method 500, the steps comprising method 500 may be completed in any suitable order.

Method 500 may be implemented using information handling system 100 or any other system operable to implement method 500. In certain embodiments, method 500 may be implemented partially or fully in software embodied in computer-readable media. In some embodiments, method 500 may be practiced substantially without (e.g., without) adversely impacting system performance (e.g., processing speed).

Figure 6:
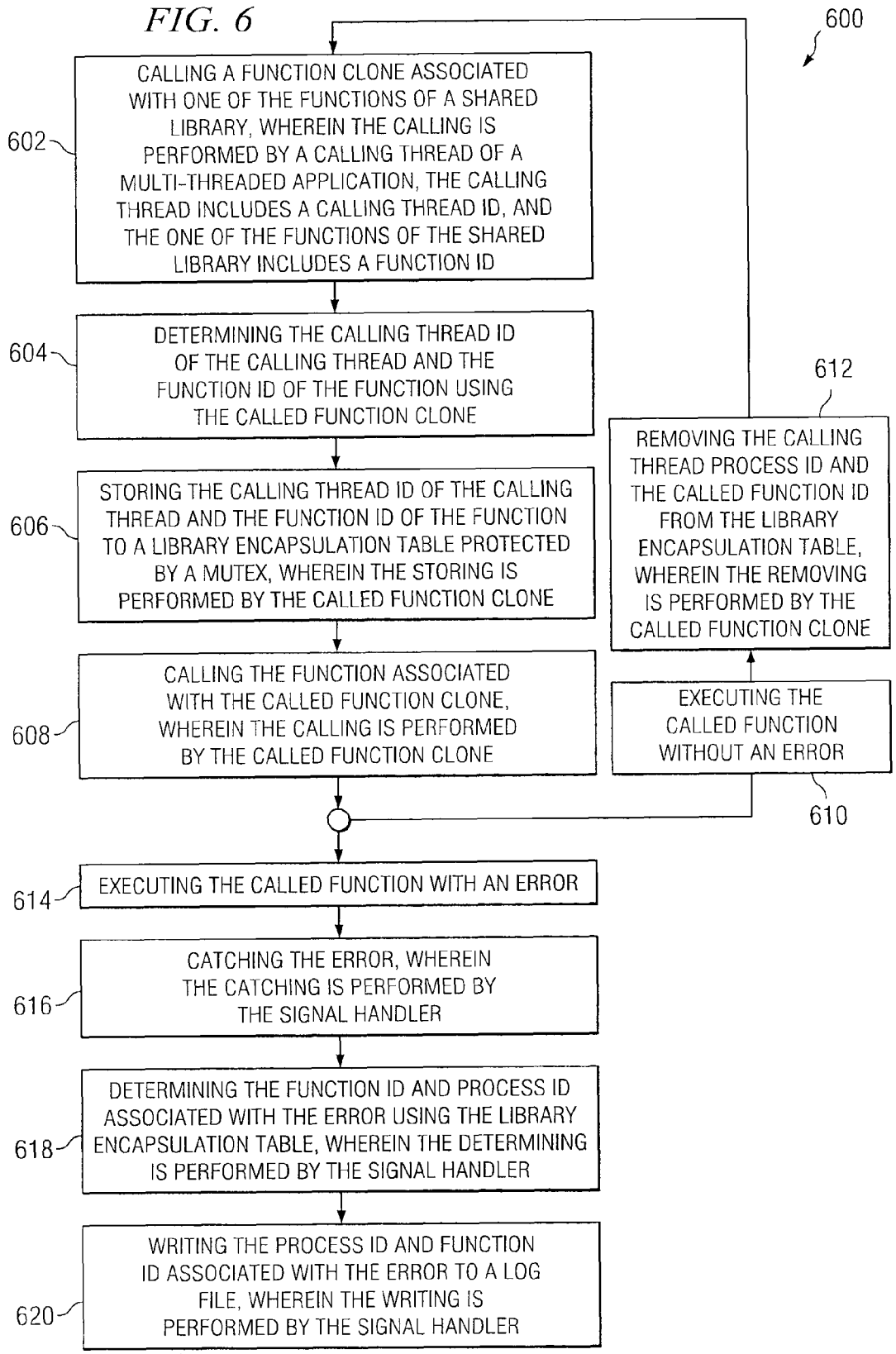
FIG. 6 illustrates a flow chart of an example method for isolating a crash in an embedded information handling system, in accordance with the present disclosure.

FIG. 6 illustrates a flow chart of an example method 600 for isolating a crash in embedded information handling system 6 (e.g., system 100, system 300) including a multi-threaded application 10 (e.g., application 110, application 310) having a signal handler 20 (e.g., signal handler 420), a shared library 60 (e.g., shared library 160, shared library 360) having at least one function, and a library encapsulation module 40 (e.g., library encapsulation module 140, library encapsulation module 240, library encapsulation module 340) having a function clone associated with each function of the shared library, in accordance with the present disclosure.

According to one embodiment, method 600 preferably begins at step 602. As noted above, teachings of the present disclosure may be implemented in a variety of configurations of system 6. As such, the preferred initialization point for method 600 and the order of the steps 602-620 comprising method 600 may depend on the implementation chosen.

At step 602, a calling thread of multi-threaded application 10 calls a function clone associated with a function of the shared library 60. For example, a CMC power management multi-threaded application 10 may include a power inventory thread 14 that calls a clone of a power supply I2C write/read function. Calling thread 34 includes a calling thread ID, and the power supply I2C write/read function of shared library 60 includes a function ID.

At step 604, the called function clone determines the process ID associated with the calling thread 34 and a function ID associated with the called function. Continuing with the example, the power supply I2C write/read function clone determines the process ID of the calling power inventory thread 14 and the function ID of the called power supply I2C write/read function.

At step 606, the called function clone stores the process ID and the function ID to library encapsulation table 50, which is protected by mutex 70. At step 608, the called function clone calls the called function associated with the called function clone. At step 610, the called function executes without an error. At step 612, the called function clone removes the calling thread process ID and the called function ID from the library encapsulation table. Subsequently, steps 602 through 612 may be repeated m times, wherein m is a non-negative integer (e.g., 0, 1, 2, 3 . . . ). Upon each repetition, the calling thread may be the same or different. Upon each repetition, the called function may be the same or different.

At step 614, the called function executes with an error. For example, while executing or attempting to execute the function, the function crashes. In some embodiments, the crash may arise from any type of error including, for example, defective hardware, defective code, defective data, defective software, defective communication, user error, and the like, and/or combinations thereof.

At step 616, signal handler 20 catches the error. At step 618, signal handler 20 uses library encapsulation table 50 to determine the function ID and process ID associated with the error (e.g., the function ID of the called function and the process ID of the calling thread associated with the error). At step 620, signal handler 20 writes the process ID and function ID associated with the error to a log file.

Although FIG. 6 discloses a particular number of steps to be taken with respect to method 600, method 600 may be executed with greater or fewer steps than those depicted in FIG. 6. For example, method 600 may further comprise closing application 10 upon detecting the error. In addition, although FIG. 6 discloses a certain order of steps to be taken with respect to method 600, the steps comprising method 600 may be completed in any suitable order.

Method 600 may be implemented using information handling system 100 or any other system operable to implement method 600. In certain embodiments, method 600 may be implemented partially or fully in software embodied in computer-readable media.

Method 600 may be implemented using information handling system 100 or any other system operable to implement method 600. In certain embodiments, method 600 may be implemented partially or fully in software embodied in computer-readable media. In some embodiments, method 600 may be practiced substantially without (e.g., without) adversely impacting system performance (e.g., processing speed).

Using the methods and systems disclosed herein, problems associated with conventional approaches to isolating a crash in an embedded information handling system may be reduced or eliminated.

Although the present disclosure has been described in detail, it should be understood that various changes, substitutions, and alterations can be made hereto without departing from the spirit and the scope of the disclosure as defined by the appended claims.

What is claimed is:

1. A method for isolating errors in an embedded information handling system including a multi-threaded application having a signal handler, a shared library having at least one function, and a library encapsulation module having a function clone associated with up to each function of the shared library, the method comprising:
    (a) a first calling thread of the multi-threaded application calling a first function clone associated with a first function of the shared library;
    (b) the called first function clone determining a process ID associated with the first calling thread and a function ID associated with the called first function;
    (c) the called first function clone storing the process ID associated with the first calling thread and a function ID associated with the called first function to a library encapsulation table protected by a mutex;
    (d) the called first function clone calling the called first function;
    (e) the called first function generating an error;
    (f) the signal handler catching the error;
    (g) the signal handler determining the function ID and process ID associated with the error using the library encapsulation table; and
    (h) the signal handler writing the process ID and function ID associated with the error to a log file.

2. A method for isolating errors in an embedded information handling system according to claim 1, wherein steps (a) through (h) are executed in sequence.

3. A method for isolating errors in an embedded information handling system according to claim 2 further comprising:
    (a') a second calling thread of the multi-threaded application calling a second function clone associated with a second function of the shared library;
    (b') the called second function clone determining a process ID associated with the second calling thread and a function ID associated with the called second function;
    (c') the called second function clone storing the process ID associated with the second calling thread and a function ID associated with the called second function to a library encapsulation table protected by a mutex;
    (d') the called second function clone calling the called second function;
    (d')(1) executing the called second function without an error; and
    (d')(2) removing the process ID associated with the second calling thread and a function ID associated with the called second function from the library encapsulation table, wherein the removing is performed by the called function clone,
    wherein (a') through (d')(2) are performed before (a) through (h).

4. A method for isolating errors in an embedded information handling system according to claim 1 further comprising:
    (i) closing the multi-threaded application upon or after an error.

5. A method for isolating errors in an embedded information handling system according to claim 1, wherein the multi-threaded application is a power management multi-threaded application.

6. A method for isolating errors in an embedded information handling system according to claim 1 further comprising performing (a) through (h) without creating or using core dump files or a debugger.

7. A method for isolating errors in an embedded information handling system according to claim 1, wherein the determining the function ID associated with the called first function further comprises deriving the string field of the function using a _FUNCTION_ preprocessor macro.

8. A method for isolating errors in an embedded information handling system including a multi-threaded application having a signal handler, a shared library having at least one function, and a library encapsulation module having a function clone associated with up to each function of the shared library, the method comprising:
    (a) calling the function clone associated with one of the functions of the shared library, wherein the calling is performed by a calling thread of the multi-threaded application, the calling thread includes a calling thread ID, and the one of the functions of the shared library includes a function ID;
    (b) determining the calling thread ID of the calling thread and the function ID of the function using the called function clone;
    (c) storing the calling thread ID of the calling thread and the function ID of the function to a library encapsulation table protected by a mutex, wherein the storing is performed by the called function clone;
    (d) calling the function associated with the called function clone, wherein the calling is performed by the called function clone; and
    (e)(1) executing the called function without an error, whereupon the called function clone removes the calling thread ID and the called function ID from the library encapsulation table, or
    (2) executing the called function with an error, whereupon the signal handler catches the error, determines the function ID and the process ID associated with the error using the library encapsulation table, and writes the process ID and function ID associated with the error to a log file.

9. A method for isolating errors in an embedded information handling system according to claim 8, wherein steps (a) through (e) are executed in sequence.

10. A method for isolating errors in an embedded information handling system according to claim 8 further comprising:
    (f) closing the multi-threaded application upon or after an error.

11. A method for isolating errors in an embedded information handling system according to claim 8, wherein the multi-threaded application is a power management multi-threaded application.

12. A method for isolating errors in an embedded information handling system according to claim 8 further comprising performing (a) through (e)(2) without creating or using core dump files or a debugger.

13. A method for isolating errors in an embedded information handling system according to claim 8, wherein the determining the function ID associated with the called first function further comprises deriving the string field of the function using a _FUNCTION_ preprocessor macro.

14. An embedded information handling system comprising:
   a processor;
   a memory communicatively coupled to the processor;
   a local storage resource communicatively coupled to the processor;
   a multi-threaded application having a signal handler executable by the processor;
   a shared library communicatively coupled to the processor, the shared library having at least one function; and
   a library encapsulation module having a function clone associated with up to each function of the shared library,
   wherein the embedded information handling system is configured to:
   (a) call the function clone associated with one of the functions of the shared library, wherein the calling is performed by a calling thread of the multi-threaded application, the calling thread includes a calling thread ID, and the one of the functions of the shared library includes a function ID;
   (b) determine the calling thread ID of the calling thread and the function ID of the function using the called function clone;
   (c) store the calling thread ID of the calling thread and the function ID of the function to a library encapsulation table protected by a mutex, wherein the storing is performed by the called function clone;
   (d) call the function associated with the called function clone, wherein the calling is performed by the called function clone; and
   (e)(1) remove from the library encapsulation table the calling thread ID and the called function ID upon error-free execution of the called function, or
   (2) catch any error that occurs during execution, determine the function ID and the process ID associated with the error using the library encapsulation table, and write the process ID and function ID associated with the error to a log file.

15. An embedded information handling system according to claim 14, wherein the embedded information handling system is configured to:
   (f) close the multi-threaded application upon or after an error.

16. An embedded information handling system according to claim 14, wherein the multi-threaded application is a power management multi-threaded application.

17. An embedded information handling system according to claim 14, wherein the embedded information handling system lacks a core dump file.

18. An embedded information handling system according to claim 14, wherein the embedded information handling system lacks a debugger.

19. An embedded information handling system according to claim 14, wherein the embedded information handling system lacks a core dump file and a debugger.

20. An embedded information handling system according to claim 14 further comprising a _FUNCTION_ preprocessor macro operable to derive the string field of the function associated with the called function clone.

* * * * *